United States Patent
Schlosser

[11] 3,753,118
[45] Aug. 14, 1973

[54] CIRCUIT FOR DETERMINING THE FREQUENCY ASSIGNED TO A MARKABLE INSTANT OF A FREQUENCY-MODULATED TRANSMITTER

[75] Inventor: Karl Schlosser, Planegg, Germany
[73] Assignee: Siemens Aktiengesellschaft, Berlin, Germany
[22] Filed: July 9, 1971
[21] Appl. No.: 161,014

[30] Foreign Application Priority Data
July 22, 1970 Germany............... P 20 36 449.2
July 22, 1970 Germany............... P 20 36 412.9

[52] U.S. Cl............... 325/134, 324/78 D, 325/131
[51] Int. Cl. ....................................... H04b 1/02
[58] Field of Search................ 325/67, 131, 133, 325/134; 331/178; 324/78 D, 79 R

[56] References Cited
UNITED STATES PATENTS
| | | | |
|---|---|---|---|
| 3,379,975 | 4/1968 | Niedereder | 325/131 |
| 3,379,976 | 4/1968 | Niedereder | 325/131 |
| 3,596,193 | 7/1971 | Dunwoodie | 331/178 X |

FOREIGN PATENTS OR APPLICATIONS
1,080,877  8/1967  Great Britain............... 324/78 D

*Primary Examiner*—Robert L. Griffin
*Assistant Examiner*—William T. Ellis
*Attorney*—Carlton Hill, Donald J. Simpson et al.

[57] ABSTRACT

A circuit for determining the frequency associated with a markable time point during the frequency-modulated transmission of a transmitter, particularly a wobbulatable transmitter employing an adjustable auxiliary wobble-control voltage determining the frequency in function of time in which the frequency is determined by a counting operation in which the impulses of the transmission are counted for a predetermined period and in which a comparator impulse produced by comparison between a preset voltage and such auxiliary control voltage, which comparator impulse may be utilized directly or indirectly for marking purposes, is utilized to control the admission of impulses of such transmission to the counter for a predetermined period or periods.

21 Claims, 6 Drawing Figures

INVENTOR
Karl Schlosser

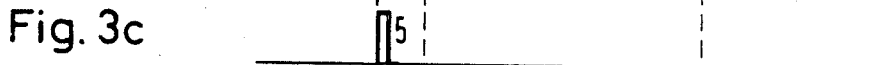
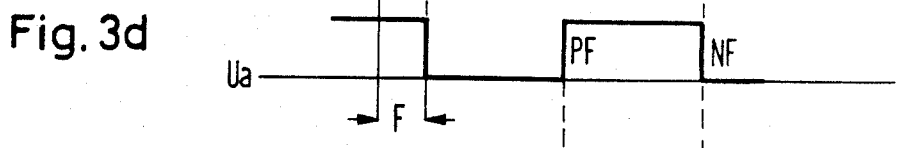
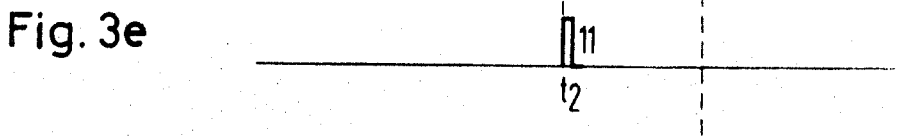
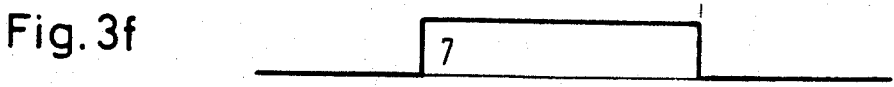
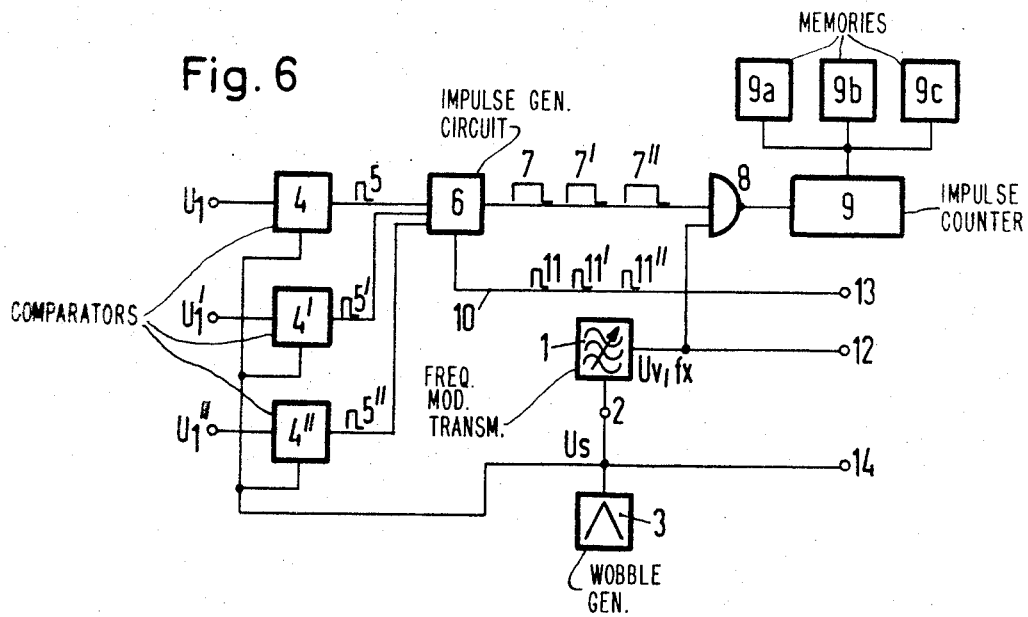

PATENTED AUG 14 1973 3,753,118

INVENTOR
Karl Schlosser
BY
Hill, Sherman, Meroni, Gross & Simpson
ATTYS.

CIRCUIT FOR DETERMINING THE FREQUENCY ASSIGNED TO A MARKABLE INSTANT OF A FREQUENCY-MODULATED TRANSMITTER

BACKGROUND OF THE INVENTION

The invention is directed to a circuit for use in determining the frequency associated with a predetermined time point during a frequency modulated transmission, the modulating frequency of which is variable with a predetermined time function between two limiting values, in particular a wobbulatable transmitter employing an adjustable auxiliary voltage which is subjected to an amplitude comparison with the wobble voltage, the latter being representative of the frequency in function of time.

Circuits of this general type heretofore have utilized the comparative results, in the form of a comparative impulse, as a marking impulse which is supplied to a suitable visual instrument reproducing the recorded frequency curve and appears as a frequency marking indication on such instrument. While the comparator impulse defines the point of time, the associated frequency is read on a frequency scale in dependence upon the position of the frequency marking point on the image screen of the visual instrument or by the position of an adjusting device for the auxiliary voltage. It will be apparent that in this type of measurement, reading errors and imprecisions in the frequency scales employed cannot be completely avoided.

BRIEF DESCRIPTION OF THE INVENTION

The invention, therefore, is directed to the problem of producing a circuit of the type generally referred to in which the frequency pertaining to a markable point of time can be determined with higher precision, and in particular without requiring the pictorial presentation of the frequency mark involved in a visual apparatus. In accordance with the invention, this is accomplished by utilizing a comparator impulse formed as a comparative result and adapted to be utilized for a direct or indirect marking of the time point, as the means for triggering the production of a gate impulse of predetermined, particularly adjustable length, which is adapted to open a gate circuit to an impulse counter whereby the latter may count impulses of the transmission frequency during such open period.

The invention has the important advantage of enabling a digital indication that is readily legible and easily recordable in a simple manner particularly useful in connection with automatic measuring operations. By suitable selection of the length of the gate impulse, the precision with which the frequency is determined can be improved as compared with circuits involving the reading of a frequency mark position. For achieving this improvement, the gate impulse length is selected at a value smaller than the borderline value which just corresponds with the image screen resolution at the frequency mark display in relation to the time required for the traverse of the frequency range.

An increase in the precision of the determination of the frequency may be additionally achieved in accordance with a preferred embodiment of the invention under otherwise equal conditions by employing a circuit in which an additional impulse is generated which coincides with the time-wise center of the gate impulse used, and is used in place of the comparator impulse as the time marking point. As a result, even when the gate impulse length to acheive the greatest resolution exceeds the borderline value thereof, the attainable precision is greater than can be accomplished with prior art circuits.

In accordance with another modification of the invention, comparator impulses produced during both forward and return variations in the wobble voltage are formed, each of which is operable to trigger a gate pulse of predetermined, particularly adjustable, length which opens a counter gate circuit whereby the counting result is derived by the total of impulses counted during the duration of each gate impulse, whereby the end result is derived from the addition of the two impulse subtotals. The respective gate impulses preferably are of equal duration and at least one of the comparator impulses is employed as the markable time point.

In addition to the important advantage of the invention that the frequency may be indicated digitally, as a result of the adjustability of the length of the gate impulse, the precision with which the frequency determination may be made is freely selectable in accordance with specific requirements.

BRIEF DESCRIPTION OF THE DRAWINGS

In the drawings wherein like reference characters indicate like or corresponding parts.

FIG. 3 represents a voltage time diagram at various points in the circuit of FIGS. 1 and 2;

FIG. 6 broadly illustrates a circuit similar to FIG. 1 in which the frequencies of several markable time points may be measured.

DETAILED DESCRIPTION OF THE INVENTION

Figure 1:
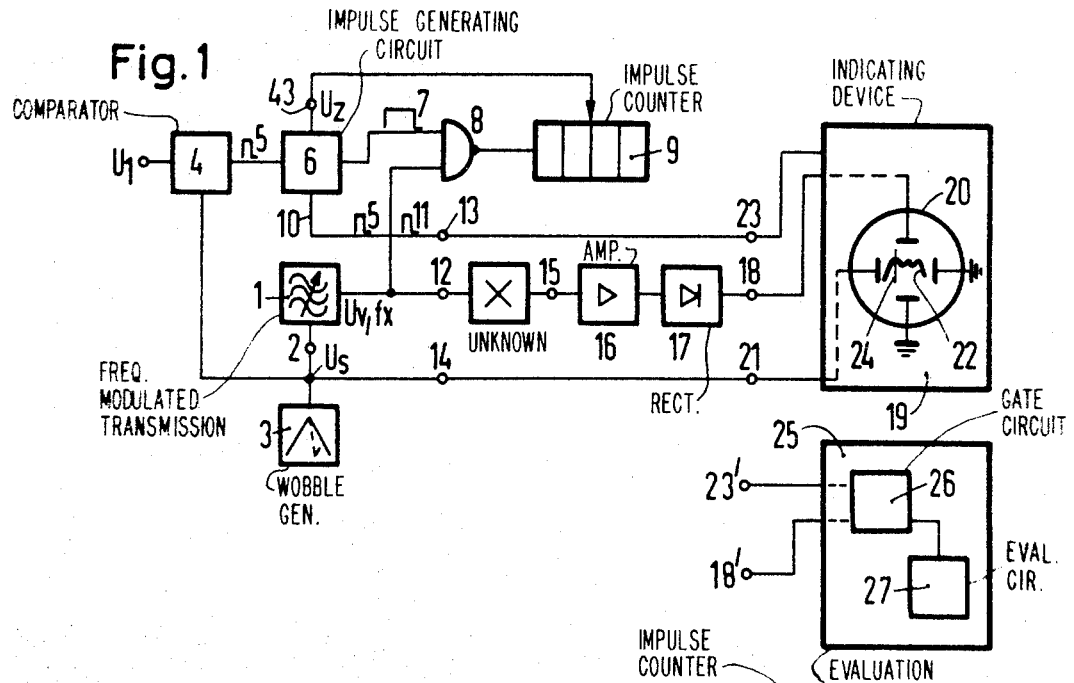
FIG. 1 illustrates the general circuit embodying the present invention, as utilized for measurement of frequency dependent transmission properties of a four terminal network.
Figure 2:
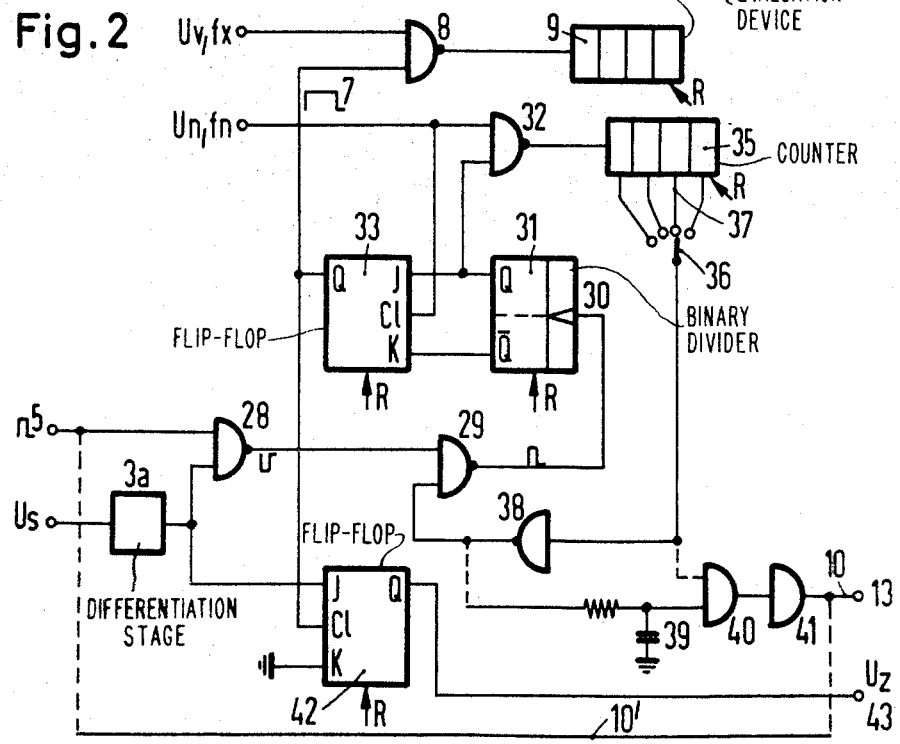
FIG. 2 illustrates in detail a preferred embodiment of a portion of the circuit of FIG. 1.
Figure 4:
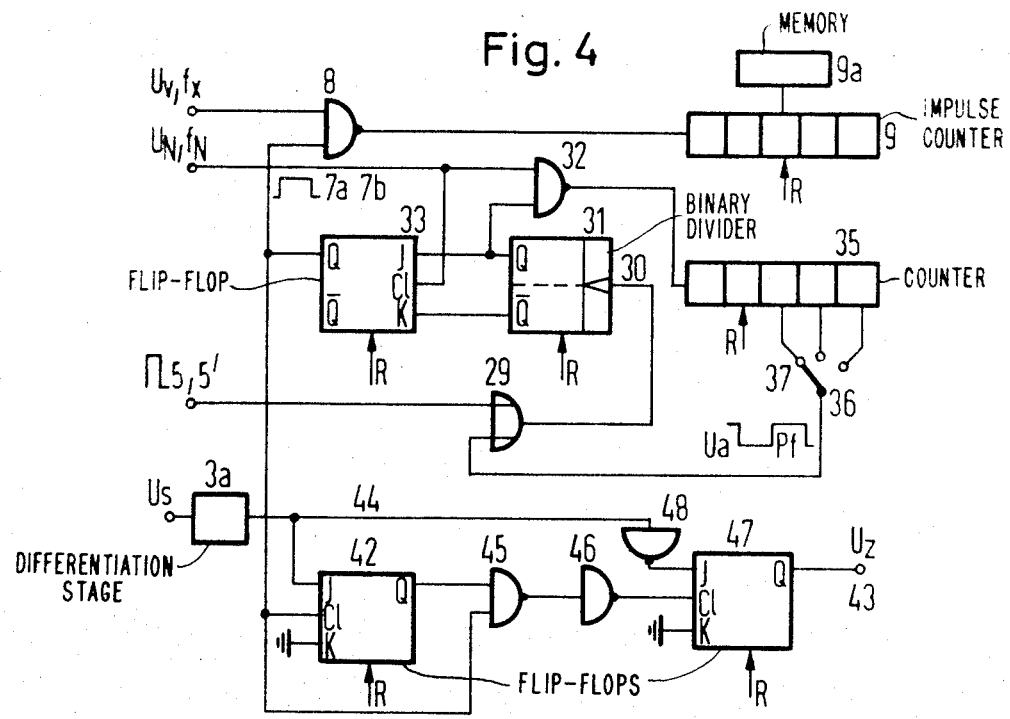
FIG. 4 illustrates in greater detail another preferred embodiment of a portion of the circuit of FIG. 1.

The invention will initially be generally discussed, primarily in connection with the disclosure of FIG. 1, followed by a detailed description of two preferred embodiments of the invention, one illustrated in FIG. 2 and the other in FIG. 4 and last, an arrangement for use in connection with a plurality of marking points within the frequency range, generally illustrated in FIG. 4.

GENERAL CONSTRUCTION

Referring to FIG. 1, the reference numeral 1 generally indicates a continuously frequency-modulated transmitter, particularly a wobbulatable transmitter, the frequency of which is adapted to be varied by a frequency control voltage $U_s$ which is applied to the control input 2 thereof, with such voltage being produced by a generator 3. The control voltage $U_s$ expediently has a time-linear course, more particularly a sawtooth or triangularly shaped course which has a periodic time dependency suitable for use as the control (wobble) voltage for the transmitter 1. The voltage $U_s$ simultaneously is supplied to a first input of a comparator 4 whose second input is connected to an adjustable DC voltage $U_1$, the comparator 4 being operable to produce in the presence of a predetermined amplitude relation, for example upon equality of amplitude, a comparator impulse 5 which is supplied to a triggerable inpulse-generating circuit 6. The circuit 6 is operative, upon the arrival of a comparator impulse 5, to produce a rectangularly shaped gate impulse 7 which is supplied to the upper input of a gate circuit 8, illustrated in the example of FIG. 1 as a NAND gate. The gate 8 is adapted to be open for the duration of the impulse 7. The lower input of the gate 8 is operatively connected to the output of the transmitter 1 whereby in the presence of the impulse 7, and opening of the gate 8, voltage impulses from the transmitter 1 and having a uniform polarity of the AC voltage $U_v$ may pass to an impulse counter 9 which will therefore count the total number of impulses passing through the gate for the duration of the impulse 7. The impulse-generating circuit 6 also delivers over a line 10 the comparator impulse 5, or, instead thereof, another impulse 11, as hereinafter described, which in each case designates a point of time applicable to the frequency $f_x$ of transmitter 1. The impulse-generating circuit 6 may also be provided with an output 43 at which can be derived an evaluation signal $U_z$ which causes suitable operation of the impulse counter, i.e., to indicate, store or record the counting result.

By additional circuitry, i.e., that appearing to the right of the terminals 12, 13 and 14, a measuring set is produced for use in the measurement of the transmission properties, in dependency upon frequency, of a four-terminal network X whose input is connected to the terminal 12. The output 15 of the four-terminal network is connected to an amplifier 16, followed by a rectifier 17 whose output voltage is supplied at 18 to one deflection system of a visual or recording apparatus 19, for example, an oscilloscope 20. Simultaneously therewith the frequency control voltage $U_s$ is supplied to the other deflection system of the oscilloscope 20 of the apparatus 19 over the terminal 21.

There thus results a pictorial presentation 22 as a function of the varying frequency of the transmitter 1 with respect to the time base of the instrument 19, representing the course of the curve of the measuring voltage appearing at the output 15 of the four-terminal network, thus representing, for example, a measurement of the attenuation thereof. The impulse 5 and/or 11 is supplied to the frequency marking input 23 of the apparatus 19 and in known manner produces a frequency marking point, for example, in the form of an additional deflection 24 of the electron beam in vertical direction or in the form of a brighter or a blacked-out spot appearing at the selected point on the frequency curve.

An evaluation device or apparatus 25 may also be provided and connected at its terminals 18' and 23' to the terminals 18 and 23 in lieu of the apparatus 19. Such a device may, for example, contain a gate circuit 26 and a suitable evaluation structure 27, such as a digital voltmeter. An impulse 5 and/or 11 in known manner produces a short duration opening of the gate circuit 26 whereby a reading or measurement value appearing at the terminal 18' can be evaluated, preferably digitally. The possibility thus exists, for example, to effect a comparison between the digital reading value obtained in 27 with respect to the counting result of the impulse counter 9, indicating the measurement frequency.

In accordance with one embodiment of the invention, the comparator impulse 5 is employed, if necessary, following suitable amplification and/or pulse formation, to directly mark the point of time. The precision of the frequency determination thereby depends primarily on the length of the gate impulse 7, which may be termed the counting time $t_z$. Assuming that the frequency of the transmitter 1 changes during the counting time from an initial value $f_1$ to the terminal value $f_2$ linearly with respect to time, the counting result is in error by the amount of $\Delta f = (f_1 - f_2/2) = (df/dt) \cdot (t_z/2)$ In the event the precision of the system illustrated is to be limited to substantially that achievable in prior art circuits, the error $\Delta f_{max}$ will not be greater than that resulting on the following basis: If $df:dt$ represents the variation of the frequency in time, $t_w$ represents the time for the passage of the frequency from one end of its alternation to the other, $t_{zmax}$ is the upper limit or threshhold value of the counting time still available, and m is the image screen resolution (for example, in percent of the screen width) of the viewing instrument employed in the prior art circuits:

$$(df/dt) \cdot t_w \cdot m = (df/dt) \cdot (t_{z\ max}/2) = \Delta f_{max}$$

(1)

There follows therefrom $$t_{z\ max} = 2 \cdot t_w \cdot m$$

(2)

If no time linearity exists, $t_{z\ max}$ corresponds in the most unfavorable situation to the product $t_w \cdot m$.

If the length of the gate impulse 7 is so selected that it is smaller than the maximum permissible counting time $t_{z\ max}$, the point of time marked by the impulse 5 may be determined within the frequency range, relative to the counted transmission frequency $f_x$ with greater precision than heretofore achieved in the prior art arrangements. By increasing the resolution of the impulse counter 9 by extending the counting time $t_z$ at small frequency ranges, it is possible that the above mentioned limiting value $t_{z\ max}$ is exceeded. However, it is possible to achieve in such case an accuracy greater than that of the circuits of the prior art by utilization of a further embodiment of the invention, and in particular by so designing the circuit 6 that an additional impulse 11 is provided which coincides, time-wise, with the center of the gate impulse 7 and thus may be substituted for the comparator impulse 5 so that $\Delta f$ moves at a time-linear frequency change toward 0, independently of the length of the counting time $t_z$.

THE CIRCUIT OF FIG. 2.

FIG. 2 illustrates in detail, a preferred embodiment of the triggerable, impulse generating means 6, fabricated from components employed in logical circuit techniques. The comparator impulse 5 appearing at the output of the comparator 4 is supplied to the upper input of a NAND gate 28 which is opened over its lower input during a frequency variation which moves from its lower threshhold value toward its upper threshhold value by a DC signal, and is closed during the return travel, i.e., during the frequency variation from the upper toward the lower threshhold value. This situation may also be expressed by designating that the lower input of gate 28 has a signal value "1" thereat during the forward variation, and a signal value "0" thereat during the return travel. In the circuit embodiment illustrated, the DC signal is derived from the frequency control voltage $U_s$ over a differentiation stage 3a.

The output of the NAND gate 28 is connected to the upper input of a NAND gate 29 whose output is connected to the counting input 30 of a binary divider stage 31, the outlet Q of which, following the arrival of an erasing impulse R, is in a "0" state. Such output Q is connected to the lower input of a NAND gate 32 and also to the input J of a JK flip-flop stage 33. The upper input of the gate 32 and the input C1 of the flip-flop stage 33 are connected to a source of normal frequency impulses $U_n$. Upon the arrival of an impulse at the input C1, the logical condition at the input J is transferred to the output Q thereof, with the operating impulses thus being derived from the normal frequency impulses $Q_n$. The output Q of the stage 33 is connected with one (lower) input of the NAND gate 8 whose output is connected to the input of the impulse counter 9 which preferably is decadic. The second (upper) input of the gate 8 is supplied with the output voltage $U_v$ of the transmitter 1 whose instantaneous frequency $f_x$ is to be determined at the point of time marked by the comparator impulse 5 or the impulse 11 within the variable frequency range.

The output of the NAND gate 32 is connected to the input of an additional, preferably decadic, counter 35 which counts the impulses of the normal frequency $f_n$, the respective counting outputs 37 of which are individually selectable by means of the movable switch contact 36, the selected output being supplied to the input of a negation stage 38 whose output is connected to the lower input of the NAND gate 29.

In accordance with the first circuit embodiment previously referred to, employing the comparator impulses 5 as the marking criterion, such impulses are supplied directly to the terminal 13 over the conductor 10 and additional connection 10', illustrated partially in broken lines. It will be appreciated that the connecting path 10' may, of course, include impulse-forming and-/or amplifying circuitry irrespective of which there may be considered a direct marking by the comparator impulse 5 of the point of time for which the frequency $f_x$ is to be determined.

In accordance with the second circuit embodiment previously referred to, wherein the direct marking of the point of time is determined by an additional impulse 11, the circuit connection 10' is eliminated and an additional circuit is provided comprising a RC member 39, a NAND gate 40 and a negation stage 41 whose circuit connections into the previously described circuitry is indicated in broken lines. In this arrangement, the output of the negation stage 38 is connected over the RC member 39 with one input of the NAND gate 40 whose second input is connected to the movable contact 36 and thus may be connected to a selected output 37 of the counter 35. The output of the gate 40 is operatively connected over the negation stage 41 and conductor 10 to the terminal 13.

The signal which may be considered a logical "1" during the forward frequency travel and to a logical "0" during the return travel, supplied to the second input of the NAND gate 28 over the differentiation stage 3a is also supplied to the input J of a JK flip-flop stage 42 whose output Q is connected to the output terminal 43, operative to supply the evaluation signal $U_z$ to the counter 9. The logical state "0" (ground) thus exists at the input K of stage 42 while the input C1 thereof is connected to the output Q of the stage 33.

The operation of the circuit illustrated in FIG. 2 will be explained with the aid of the voltage-time diagrams illustrated in FIG. 3, the respective lines 3a – 3f being coordinated as to time with respect to one another. FIG. 3a represents the normal frequency impulses $U_n$, 3b the wobble voltage $U_s$ with a triangular time dependency and 3c depicts a comparator impulse occurring at time $t_1$ at which the voltage $U_s$ and the adjustable auxiliary voltage $U_1$ attain an equality of amplitude.

Referring to FIG. 2, the incoming comparator impulse 5 is conducted over the NAND gate 28, as a negative impulse, to the upper of the gate 29 during the forward frequency travel, i.e., during the ascending flank of the triangular voltage $U_s$, as the lower input of the gate 28 has the signal "1" thereat. As the signal "1" also appears at the lower input of the gate 29 in the rest position of the circuit, the production of a positive impulse results at the output of the NAND gate 29 which approximately corresponds to the comparator impulse 5. The positive impulse delivered by the gate 29 is supplied to the counting input 30 of the stage 31 whereby the output Q thereof, previously in restored condition of "0," is flipped to a "1." It will be appreciated that as long as a "1" appears at Q, the NAND gate 32 will remain open, permitting the normal frequency impulse $U_n$ to pass into the impulse counter 35 and counted therein, preferably decadically. When the counting results in the counter 35 reaches that selected by the switch contact 36, an output signal $U_a$ (FIG. 3d) will be conducted over the contact 36 to the negation stage 38 whereby the negative flank NF of the signal $U_a$ will result in the generation of an additional counting inpulse appearing at the output of the gate 29 and thus at the input 30 of the stage 31 resulting in the output Q thereof being switched from a "1" to "0," the output $\overline{Q}$ thereof simultaneously switching to a "1" . The NAND gate 32 therefore is blocked to the impulses $U_n$ resulting in the conclusion of the counting operation in the counter 35.

During the counting operation in the counter 35, and in accordance with the state of the output of the stage 31, a "1" is present at the input J of the flip-flop stage 33 and a "0" is at the input K thereof. Consequently, the first negative flank of $U_n$ (NFN of FIG. 3a) occurring after the beginning of the counting of $U_n$ is supplied to the input C1 of the stage 33, as a result of which the "1" is shifted from J to Q, whereby the NAND gate 8 is opened for the incoming oscillations of the transmitter voltage $U_v$ whose frequency $f_x$ is to be determined, which oscillations are thereby supplied to the impulse counter 9. Upon termination of the counting process in 35, resulting from a resetting of the stage 31, the "1" is removed from the input J of stage 33 and replaced by a "0" so that upon the appearance of the first negative flank NFN' of the voltage $U_n$, following the end of a counting period, the condition "0" appears at the output Q thereof. The gate 8 is thereby blocked with respect to the voltage $U_v$, concluding the counting operation in the counter 9. The output voltage of stage 33, ilustrated in FIG. 3f which is present during a period of time as determined by the selected output of the counter 35 thus corresponds to the gate impulse 7 of FIG. 1.

During the frequency return run, i.e., that corresponding to the negative flank of the voltage $U_f$, no counting operation takes place in the counters 35 and 9 as the NAND gate 28 is blocked as a result of the logical signal "0," and consequently the comparator impulses 5 have no effect. During the return run, it is expedient to derive from the voltage $U_s$ a resetting inpulse R which is supplied to the individual stages of the counters 35 and 9 and the stages 31, 33 and 42. In accordance with the general circuit illustrated in FIG. 1, the comparator impulses 5 may be transmitted over the connection 10', illustrated partially in broken lines, to the output conductor 10 and the terminal 13, and thus is available for use in directly marking the time point $t_1$ associated with the frequency $f_x$ to be determined.

In accordance with the second embodiment heretofore referred to, the connection 10' is broken or eliminated and is replaced by the RC member 39, gate 40 and negation stage 41. With this arrangement, the positive flank PF of the output signal $U_a$ is supplied to the upper input of the gate 40 and the lower input thereof is supplied through the RC member 39 from the output of the negation stage 38, the RC member 39 being designed with a suitable time constant as a result of which a "1" will be present at both inputs of the gate 40 for a predetermined period of time whereby a positive impulse is delivered to the output 13, available as a marking impulse 11 at the time $t_2$, i.e., at the time-wise center of the gate impulse 7 (FIG. 3e). Also, the negative flank NF of voltage $U_a$ will not cause a delivery of an impulse at 13 as it is supplied to the one input of gate 40 without delay and thus prior to and after its occurrence one of the two inputs of gate 40 always must be disposed at "0."

The gate impulse 7 present at the output Q of stage 33 advantageously is supplied to the input C1 of a JK flip-flop stage 42 thereby causing, during the frequency forward run, the appearance of a "1" at the output Q thereof and thus to the terminal 43. It will be noted that in this case, the negative flank of 7 causes this action.

As a result, an evaluation signal $U_z$ appears at the terminal 43, which signal initially occurs upon termination of the counting operations in the counters 9 and 35 and continues to remain for the remainder of the frequency forward run and at least a part of the frequency return run. Only with the arrival of a resetting impulse R, which expediently may be derived from the voltage $U_s$ during the frequency reverse run thereof, will the output of stage 42 be reset to "0" whereby the voltage $U_z$ will disappear at the output Q thereof.

The voltage $U_z$ thus can be advantageously utilized to cause the counter 9 to indicate or to emit the counting results, for example, by an illumination control of suitable indicator or counting tubes associated with the individual counter stages, or to cause a transfer of the counting results to the counting stages of a memory operatively following the respective counting stages.

It will be appreciated that by the utilization of the method of determining the time base of the counter 9 by means of a second counter 35 which counts the pulses of a normal frequency, the maximum error thereby created is one duration of a period of the voltage $U_n$ and it will be apparent that this can be maintained quite small by a sufficiently high value for the frequency $f_n$. While an additional error F results from the association of the counted frequency $F_x$ with the mark time point $t_1$, resulting from the fact that the counting operation does not immediately start with the presence of the comparator impulse 5, but only with the immediately following negative flank NFN of the voltage $U_n$, even this error or imprecision may be restricted to a low value by a correspondingly high value of the frequency $f_n$. For example, a normal frequency $f_n$ of one $M_c$, or higher, may be employed, whereby F is at the most one microsecond. However, when marking is effected at the time point $t_2$ by means of the impulse 11, the error F is eliminated.

THE CIRCUIT OF FIG. 4

FIG. 4 illustrates a further preferred embodiment of the invention, with FIG. 4 generally corresponding to the circuit of FIG. 2 and thus insertable in the circuit of FIG. 1, and with FIG. 5 generally corresponding to FIG. 3 and illustrating representative voltages at various points of the circuit. This construction operationally is quite similar to that heretofore described, this embodiment however employing both the forward and the return run of the frequency variations of the voltage $U_s$ whereby comparator pulses are produced for both the ascending flank and the descending flank of the voltage $U_s$ to produce two gate impulses 7a (ascending) and/or 7d (descending) which preferably are of equal duration. In this case the impulse counter 9 is adapted to count two impulse sub-totals which are added and the grant total of both is then evaluated as a counting result. Likewise, in this arrangement, at least one of the comparator impulses 5, if necessary or desirable following corresponding amplification and/or pulse formation, is conducted over the conductor 10 of FIG. 1 for marking the time point of the frequency $f_x$ of the transmitter 1 to which the counting result of the impulse counter 9 is associated.

Referring to FIG. 4, the comparator impulse 5, delivered by the comparator 4 is supplied to the upper input of the gate 29 which in this embodiment is an OR gate, whose output is connected to the input 30 of the binary divider stage 31. The output Q of the stage 31, which following the arrival of a resetting impulse is in a "0" state, is connected to the lower input of the NAND gate 32, to the upper input of which is connected the source of normal frequency impulses UN having the frequency $f_n$, and also to the input J of the JK flip-flop stage 33, which upon the arrival of an impulse at the input C1 operatively switches the logical data state appearing at the input J to the output Q. The output $\overline{Q}$ of the stage 31 is connected to the input K of the stage 33.

It will be apparent that the controlling impulses for the stage 33, as in the arrangement of FIG. 2, are derived from the normal frequency impulses $U_n$. The output Q of stage 33 is connected to the lower input of the NAND gate 8 whose output again is connected to the input of the preferably decadic impulse counter 9. The upper input gate 8 is connected to receive the output voltage $U_v$ of the transmitter 1 whose instantaneous frequency $f_x$ is to be determined at the point of time marked by the comparator impulse 5 within the frequency range. The output of the NAND gate 32 is connected to the input of an additional, likewise preferably decadic counter 35 which again counts the impulses of the normal frequency $U_n$. As in the previous circuit of FIG. 2, any one of the outputs 37 of the respective counter stages may, by means of the movable switch contact 36, be operatively connected to the lower input of the OR gate 29.

A JK flip-flop stage 42 is additionally provided, at the input J of which appears a logic "1" during the frequency forward run and a "0" during the frequency return run, as a result of the connection of such input over the conductor 44 to the output of the differentiation stage 3a, the input of which is connected to the frequency control voltage $U_s$. As in the circuit illustrated in FIG. 2, the input K of the stage 42 is connected to ground while the input C1 is connected to the output Q of stage 33. The output Q of the stage 42 is connected to the upper input of a NAND gate 45, the lower input of which is connected to the output Q of the stage 33. The output of the gate 45 is connected over a negation stage 46 to the input C1 of an additional JK flip-flop stage 47 whose input J is connected over a negation stage 48 and conductor 44 to the output of the differentiation stage 3a, while the input K of the stage 47 is grounded. The output Q of stage 47 is connected to the terminal 43 at which the evaluation signal $U_z$ appears and may be operatively connected to the counter 9.

Figure 5A:
FIG. 5 represents voltage time diagrams, similar to FIG. 2, at various points of the circuits of FIGS. 1 and 4.
Figure 5B:
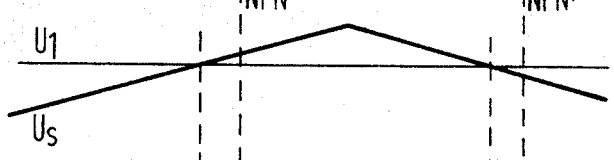
Figure 5C:
Figure 5D:
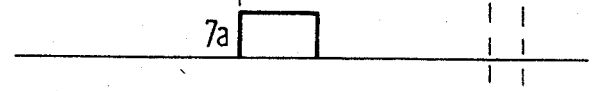
Figure 5E:
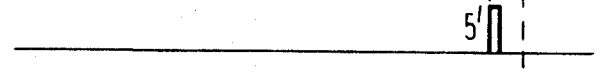
Figure 5F:
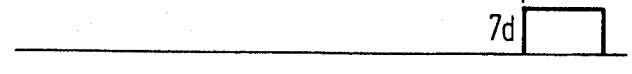

The manner of operation of the embodiment illustrated in FIG. 4 will be readily apparent when considered with the voltage-time diagrams illustrated in FIG. 5, in which FIG. 5a represents the normal frequency impulses $f_n$, and FIG. 3b illustrates the frequency control voltage $U_s$ having a triangular time dependency and its association with the adjustable auxiliary voltage $U_l$.

As in the circuit of FIG. 2, upon amplitude equality of voltages $U_s$ and $U_l$, at the time $t_1$, a comparator impulse 5 (FIG. 5c) occurs which is conducted over the OR gate 29 to the counting input of the binary divider stage 31, as a result of which a "1" appears at the output Q thereof, while the complementary output Q changes from "1" to "0." As long as a "1" is present at the output Q of the stage 31, the NAND gate 32 will remain open for normal frequency impulses $U_n$ (FIG. 5a) which thus may pass into the impulse counter 35 where they are suitably counted, preferably decadically. Again, when a total is reached in the counter, as determined by the selection of the desired counter output 37 in accordance with the position of the movable switch contact 36, an output signal $U_a$ is obtained whose positive flank Pf is supplied over the gate 29 to the input 30 of the stage 31 as an additional counting impulse. As a result, the output Q of stage 31 is returned from a "1" to a "0" while Q returns to a "1." The NAND gate 32 is thereby blocked with respect to the normal frequency $U_n$ and the counting operation in the counter 35 is thus concluded.

With the initiation of the counting operation in the counter 35, in accordance with the output conditions of the stage 31, a "1" appears at the input J of the JK flip-flop stage 33 while a "0" appears at the input K. Consequently, the immediately following negative flank of the voltage $U_n$ (NFN in FIG. 5a) which is supplied to the input C1 of stage 33 results in the "1" being switched from the input J to the output Q and thus supplied to the lower input of the NAND gate 8, opening the latter for incoming oscillations of the transmitter voltage $U_v$ which are thus counted in the counter 9. Upon termination of the counting operation in the counter 35, resulting from the resetting of stage 31, the "1" disappears from the input J of stage 33 and is replaced by "0" so that upon the appearance of the immediately following negative flank of the voltage $U_n$, the output Q returns to a "0" stage. The output voltage of stage 33, illustrated in FIG. 5d, as determined by the selected output 37, thus corresponds to the gate impulse 7 of FIG. 1.

It will be apparent that during the frequency forward run, that is during the ascending flank of the voltage $U_s$, a logic "1" is present at the input J of stage 42 while at the same time the logic "0" is conducted over the negation stage 48 to the input J of stage 47. If a gate impulse 7 now appears at the output of stage 33, its negative flank is utilized over the input C1 of stage 42 to effect a transfer of the "1" from input J to output Q. The NAND gate 45 will thereby have a logic "1" at its upper input and as the gate impulse 7 simultaneously is conducted to the lower input of such gate its lower input will thereby be switched to "0" so that a "1" remains unchanged at the output of gate 45. Thus, as a result of the negation stage 46, a "0" is conducted to and appears at the input C1 of the stage 47. Consequently, during the forward run no signal $U_z$ occurs at the terminal 42 which could be supplied to the counter 9 as an evaluation signal and the counter thus does not indicate the partial result formed during the frequency forward run.

During the frequency return run the process of the counting of the impulses of the voltage $U_b$ are repeated in the manner described whereby the initiation of the counting operation is determined by the comparator impulse 5' (FIG. 5e) which is produced upon amplitude equality of the voltages $U_s$ and $U_l$. Following the start of the counting operation in counter 35 the immediately following negative flank of $U_n$, designated in FIG. 5a as NFN', causes the transfer of the "1" appearing at J of stage 33 to the output Q thereof whereby an additional gate impulse 7d (FIG. 5f) is formed whose length depends in like manner to that of the impulse 7a on the position of the movable switch contact 36. If no change has taken place in the setting thereof, the forward and return run gate impulses 7a and 7d are of equal duration.

The rear flank of the impulse 7d supplied to the input C1 of stage 42 results in the transfer of the logic "0" from the input J of stage 42 to the output Q thereof whereby both inputs of the gate circuit 38 are changed at this instant from the state "1" to the state "0," resulting in a switching at the output side thereof from "0" to "1." Negation 39 effects an inversion thereof whereby the negative impulse flank resulting at the input C1 of stage 47 results in the transferring of the logic "1," present at J during the frequency return run, to the output Q, thereby supplying an evaluation signal $U_z$ to the terminal 43 and thus to the counter 9.

The signal $U_z$ thereby causes the counter 9 to indicate or emit the counting result, for example by an illumination control of suitable indicator tubes associated with the individual counter stages or by transferring the counting result to a subsequently connected memory 9a (FIG. 4). The use of a memory in the wobble operation has the advantage that even with the marking of a point shortly after the beginning of the frequency transmission there will not be unduly large intervals between the individual indications of the counting results, whereas in the absence of such a memory the illumination control, particularly at low wobble frequencies, could produce an undesired flickering.

Upon termination of the complete counting operation, as determined by the evaluation signal $U_z$, a resetting impulse is derived, preferably from a suitable voltage, for example the voltage $U_s$, fed from the circuit 6 of FIG. 1, such resetting impulse being supplied to the respective counter stages of the counters 9 and 35 and the stages 31, 33, 42 and 47, thereby resetting them into their rest position, and preparing the circuit for the immediately following counting operation.

It will be appreciated that in this embodiment, employing a second counter 35 in which the normal frequency $f_n$ is counted, for each of the two time bases 7a and 7d for counter 9, the resulting error amounts in each case to not more than one period duration of the voltage $u_n$. Likewise, by adding the two sub-totals obtained during the forward and reverse runs, and assuming gate impulses 7a and 7d of equal duration, as well as a constant frequency variation rate of voltage $U_v$, an additional error occurs for the forward and reverse runs in the association of the counting result of 9 to the point of time designated by 5 or 5' which corresponds at most to half a period duration of voltage $U_n$. This error may be attributed to the fact that the time distance of the impulse 5 at the beginning of the gate impulse 7 may vary at the most by one period duration of voltage $U_n$. The maximum error with respect to the association of the counted frequency to the marked time point $t_1$ under these conditions thus amounts to half a period duration of voltage $U_n$ as a result of the differential duration of the time bases, and in addition, to another half period of time as a result of the mentioned differential time distances. As in the previous arrangement, such errors can be kept at a suitably small figure by the employment of a sufficiently high frequency for the voltage $f_n$, for example 1 MC.

THE CIRCUIT OF FIG. 6

FIG. 6 illustrates the utilization of the present invention to provide a plurality of different marker points, each at its own point of time for example within a single passage of the frequency from its own limiting value to its other limiting value. In this arrangement, a separate comparator 4, 4' and 4'' is provided for each time point, each being controlled by its respective adjustable auxiliary voltage $U_I$, $U_{I'}$, and $U_{I''}$, whereby respective comparator impulses 5, 5' and 5'' are produced which are staggered in time and conducted to suitable impulse-generating means 6 to produce respective corresponding gate impulses 7, 7' and 7'', likewise staggered in time. The gate pulses are supplied to the gate circuit 8 and the counting results obtained during the presence of each gate impulse are suitably conducted from the counter 9 and stored in individual memories 9a, 9b and 9c.

It will be appreciated that the example illustrated in FIG. 6 is merely illustrative to explain the principle and is not limited to merely three markable time points during one frequency passage. Likewise, any multiplicity of time points may be similarly utilized and the frequency values $f_x$ thereof determined, providing the time duration of the comparator impuses is greater than the preselected counting time.

Having thus described my invention, it will be obvious to those skilled in the art from the disclosure herein given that various immaterial modifications may be made in the same without departing from the spirit of my invention.

I claim as my invention:

1. A circuit for determining the frequency associated with a time point defined by the occurrence of a marking impulse during the frequency sweep of a signal produced by a wobble frequency transmitter employing an adjustable auxiliary wobble control voltage produced by a generator and controlling the frequency in function of time, comprising a comparator arranged to effect an amplitude comparison between a preset voltage supplied to one input of said comparator and said auxiliary control voltage supplied to a second input of said comparator, operative to produce a comparator impulse upon a predetermined comparative result, which forms a marking impulse, the occurrence of which defines said time point, an impulse counter for counting half-wave impulses emanating from the frequency swept signal and a control circuit responsive to such comparator impulses, operatively connecting said transmitter and counter for controlling the admission of the the said emanating impulses to said counter, to effect a counting therein of said associated frequency.

2. A circuit according to claim 1, for effecting the determination of the respective frequencies of a plurality of such time points defined by the occurrence of a plurality of marking impulses within one predetermined run over the frequency sweep range, comprising a comparator for each such time point, each of which is supplied with said auxiliary wobble voltage and with a respective different preset voltage, for respective comparisons with said auxiliary voltage, and storage means operatively connected to said counter for individual consecutive storage of the respective counting results for each of such definable time points.

3. A circuit according to claim 1, wherein said control circuit is constructed to effect entry of said emanating pulses into said counter only during the forward part of the frequency sweep, with the total thereby derived in said counter comprising the counting total.

4. A circuit according to claim 1, wherein said control circuit is constructed to effect entry of said emanating pulses into said counter during both forward and return parts of the frequency sweep with the sum of the totals derived during the forward part and the immediately following return part comprising the counting total.

5. A circuit according to claim 1, for the frequency dependent measurement of the transmission properties of a four terminal network, comprising in further combination a digital voltage evaluation device, a gate circuit having its output connected to the input of said digital evaluation device, the frequency swept signal of said transmitter being supplied to the imput of said four terminal network, the output of said four terminal network being connected to one input of said gate circuit, the controlling input of said gate circuit having comparator pulses supplied thereto.

6. A circuit according to claim 1 for the frequency-dependent measurement of the transmission properties of a four terminal network, further comprising an indicating device, said frequency swept signal of said transmitter being supplied to the input of said four terminal network, and the output thereof connected to said indicating device, said wobble voltage being supplied to said device and operable to maintain a determinable time base, said comparator impulse being conducted to said indicating device as a marking pulse.

7. A circuit according to claim 1, comprising in further combination means connected to said control circuit for creating a center impulse which is present at the time-wise center of the admission time of said emanating impulses to said counter and thus usable in lieu of the comparator impulse for defining the said time point.

8. A circuit according to claim 7, for the frequency-dependent measurement of the transmission properties of a four terminal network, comprising in further combination a digital voltage evaluation device, a gate circuit having its output connected to the input of said digital evaluation device, the frequency swept signal of said transmitter being supplied to the input of said four terminal network, the output of said four terminal network being connected to one input of said gate circuit and another input of said gate circuit having said center pulses supplied thereto.

9. A circuit according to claim 7 for the frequency-dependent measurement of the transmission properties of a four terminal network, further comprising an indicating device, said frequency swept signal of said transmitter being supplied to the input of said four terminal network, and the output thereof connected to said indicating device, said wobble voltage being supplied to said device and operable to maintain a determinable time base, said center impulse being conducted to said indicating device as a marking pulse.

10. A circuit according to claim 1, wherein said control means comprises impulse generating means and a gate circuit operatively connecting said transmitter and counter, said impulse generating means being connected to said gate circuit and operative to deliver thereto in response to a comparator impulse, a gate impulse of predetermined length, during which such gate is open for the passage of impulses from said transmitter to said counter.

11. A circuit according to claim 10, wherein said impulse generating means comprises a second gate circuit to which said comparator pulses are supplied, and a second counter operatively connected thereto, a source of standard frequency impulses operatively connected by said second gate circuit to said second counter, the latter being operative to deliver a retangular voltage, the frequency of which is a sub-multiple of said standard frequency, so that a blocking of said second gate circuit occurs in the presence of the flank at the end of a period of said rectangular voltage, whereby the gate impulse for said first gate may be derived from a signal defining the open duration of the second gate circuit.

12. A circuit according to claim 11, wherein said impulse generating means further includes a binary divider stage to which comparator impulses are supplied, means for deriving an impulse from said rectangular voltage flank and means for supplying said last mentioned impulse to said divider stage for blocking the same whereby the output of said divider stage is operative to supply the gate impulse for said second gate.

13. A circuit according to claim 12, wherein said impulse generating means further includes a JK flip-flop stage having its clock input supplied by said source of standard frequency impulses, the output of said divider stage being connected to another input of said flip-flop stage and the output thereof being connected to said first gate whereby switching of the latter occurs in each case in the presence of the immediately following flank of predetermined polarity of said standard frequency impulses.

14. A circuit according to claim 13, comprising in further combination, means responsive to said rectangular voltage for creating from a flank thereof present at the center of the period of said rectangular voltage, a center impulse which thus is present at the center of the gate impulse for said first gate and usable for defining the said time point.

15. A circuit according to claim 14, wherein said center pulse forming means comprises a NAND gate, to one input of which said rectangular voltage is supplied, and a delay member and a negation stage serially connected, and operatively conducting said rectangular voltage to another input of said NAND gate, said center pulse being obtained at the output of said NAND gate.

16. A circuit according to claim 15, wherein said impulse generating means further includes a second JK flip-flop stage, the clock input of which is supplied with said gate impulses for the first gate and another input is supplied with a signal derived from said wobble control voltage whereby said signal is dependent upon the part (forward or return) of the frequency sweep of said transmitter, the output of said second flip-flop stage being operable to supply an evaluation signal for evaluating the count of said first counter.

17. A circuit according to claim 16, wherein said second flip-flop stage includes means for producing an evaluation signal at the end of each gate impulse for said first gate, whereby the evaluated total in said first counter represents the total of the counting operation during a single gate impulse.

18. A circuit according to claim 16, comprising in further combination, means operatively connecting the output of said second flip-flop stage and said first counter for conducting such an evaluation to said first counter only at the end of a gate impulse for said first gate occurring during return part of the frequency sweep, whereby the total evaluated in said first counter represents the sum of the totals counted in counting operations during two of such gate pulses respectively occurring during a forward part and an immediately following return part of the frequency sweep.

19. A circuit according to claim 18, wherein said means connecting said second flip-flop stage and said first counter comprises a third flip-flop stage, the output of which is connected to said first counter for supplying an evaluation pulse thereto, a gate having its output connected by a negation stage to the clock input of said third flip-flop stage, one input of said last-mentioned gate being connected to the output of said second flip-flop state and another input conneced to receive gate impulses for said first gate, said third flip-flop stage having another input connected by a negation stage to the means supply said signal, dependent upon the part (forward or return) of the frequency sweep derived from said wobble control voltage.

20. A circuit according to claim 19, wherein said means for supplying said blocking impulse to said divider state comprises a gate, the output of which is connected to the input of said divider stage, one input of said last-mentioned gate being connected over a negation stage to the operative output of said second counter, another input of said last-mentioned gate being connected to the output of a further gate, said further gate having two imputs, one of which is connected to receive said comparator impulses, and the other input is connected to the means supplying said signal dependent upon the part of the frequency sweep of said transmitter.

21. A circuit according to claim 1, comprising in further combination, an impulse-generating circuit, for reshaping said comparator impulses, to the input of which said comparator impulses are conducted, the output of said impulse generator circuit being operatively connected to said counter.

* * * * *